Dec. 6, 1960  R. L. FULLER ET AL  2,962,928
MOTION CAMERA

Filed May 3, 1956  3 Sheets-Sheet 1

INVENTORS
ROBERT L. FULLER
AGIS I. MIHALAKIS
By George C. Sullivan
Agent

Dec. 6, 1960   R. L. FULLER ET AL   2,962,928
MOTION CAMERA
Filed May 3, 1956   3 Sheets-Sheet 2
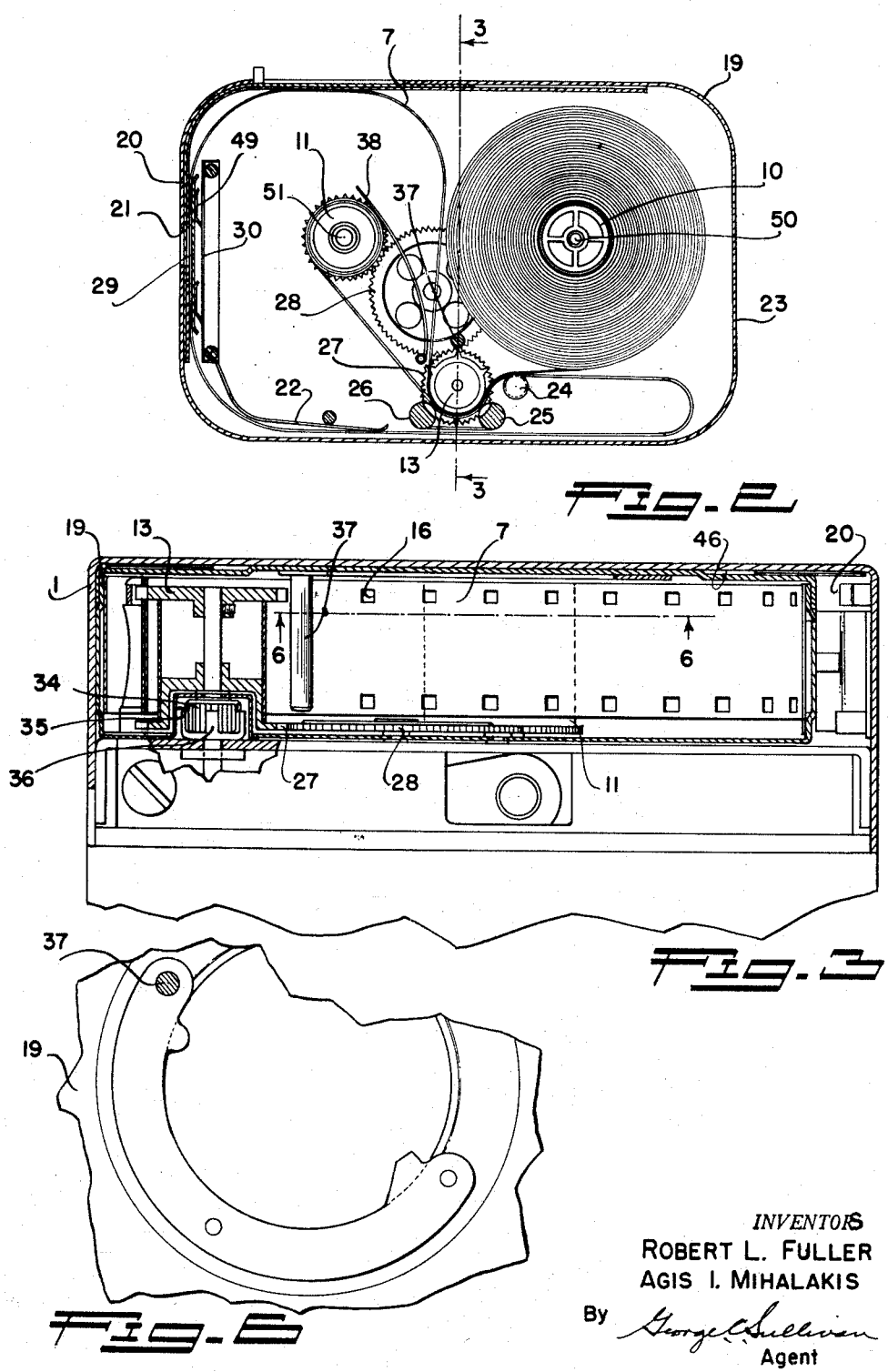
INVENTORS
ROBERT L. FULLER
AGIS I. MIHALAKIS
By George C. Sullivan
Agent Dec. 6, 1960  R. L. FULLER ET AL  2,962,928
MOTION CAMERA
Filed May 3, 1956  3 Sheets-Sheet 3
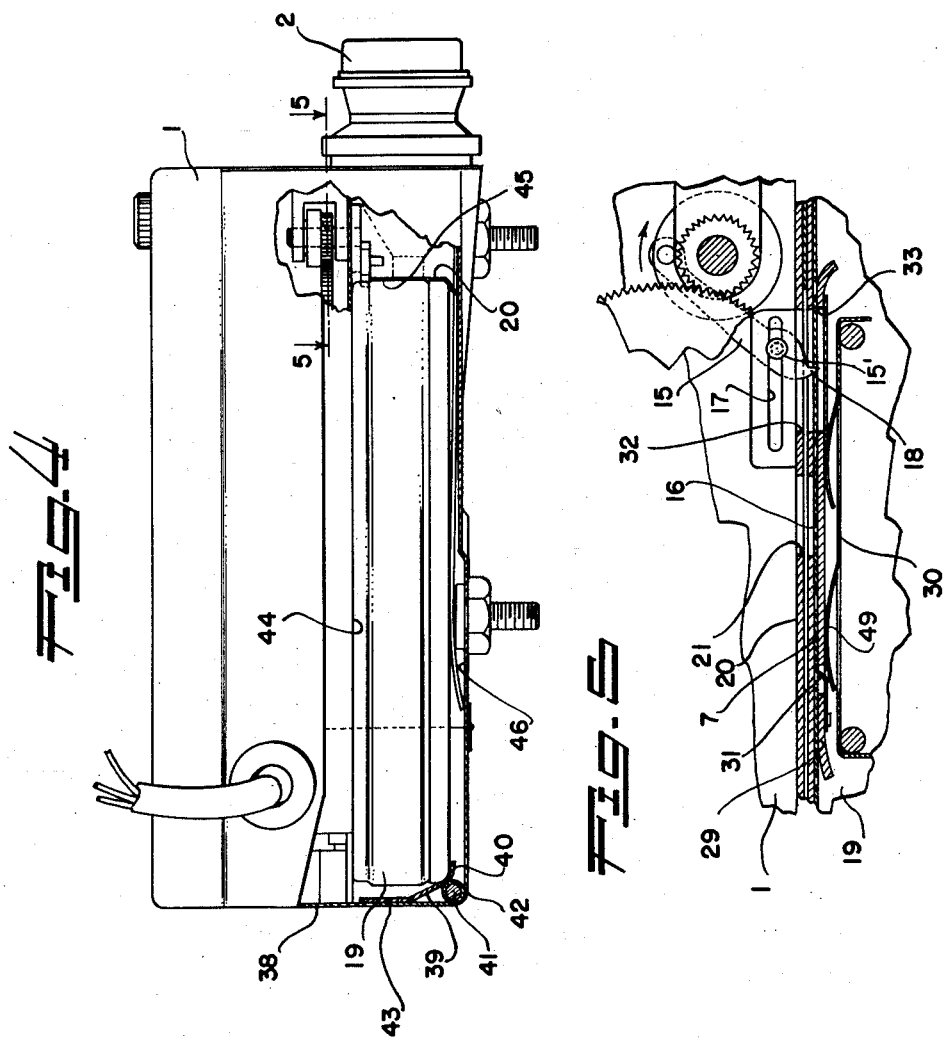
INVENTORS
ROBERT L. FULLER
AGIS I. MIHALAKIS
By George C. Sullivan
Agent ered unidirectionally in the same direction as the motor 4 and the major moving parts of the camera so that the inertia of the parts tends to maintain the camera operation and the shutter speed will not be noticeably affected by the high acceleration loads.

United States Patent Office
2,962,928
Patented Dec. 6, 1960

2,962,928

MOTION CAMERA

Robert L. Fuller, Burbank, and Agis I. Mihalakis, Canoga Park, Calif., assignors to Lockheed Aircraft Corporation, Burbank, Calif.

Filed May 3, 1956, Ser. No. 582,359

3 Claims. (Cl. 88—17)

This invention relates generally to intermittent operation type motion cameras for use under extreme environmental conditions such as may be encountered in the flight of a missile or the like and more particularly to improvements in the construction and arrangement of the film storage and feeding mechanism forming a pair of such cameras.

Optically, the intermittent operation type motion camera is most desirable, since images may be formed on film with little or no distortion using an economical lens system which is small and light in weight.

Conventional cameras of the intermittent operation type employ numerous reciprocating parts which are sensitive to acceleration loads. This results in producing widely varying camera frame rates and in some instances complete camera failure when used under rugged environmental conditions. Also, conventional intermittent operation motion cameras are unsatisfactory for use in a high acceleration environment due to inadequacies in the film feeding mechanism and the camera construction for maintaining the film in a substantially fixed position relative to the camera lens.

It is an object of this invention to provide a magazine load, intermittent operation type motion camera which will operate dependably in a high vibration and shock load environment.

It is another object of this invention to provide a film feeding and stripping mechanism for motion cameras of the intermittent operation type which will permit continuous movement of the film at the storage and take-up spools and intermittent movement of the film at the exposure aperture under high acceleration loads without jamming.

Still another object of this invention is to provide film magazine restraining means for effectively maintaining the film magazine in the proper position with respect to the camera lens under high vibration and shock load conditions.

Further and other objects will become apparent from a reading of the following description, especially when considered in combination with the accompanying drawing wherein like numerals refer to like parts.

In the drawing:

Figure 2 is a sectional plan view of a film magazine incorporating the teachings of this invention;

Figure 3 is an enlarged sectional view taken on line 3—3 of Figure 2 showing the magazine installed in a camera of the type schematically illustrated in Figure 1;

Figure 4 is a fragmentary sectional sideview of the magazine and camera of this invention;

Figure 5 is a sectional view taken on line 5—5 of Figure 4;

Figure 6 is a sectional view taken on line 6—6 of Figure 3.

Figure 1:
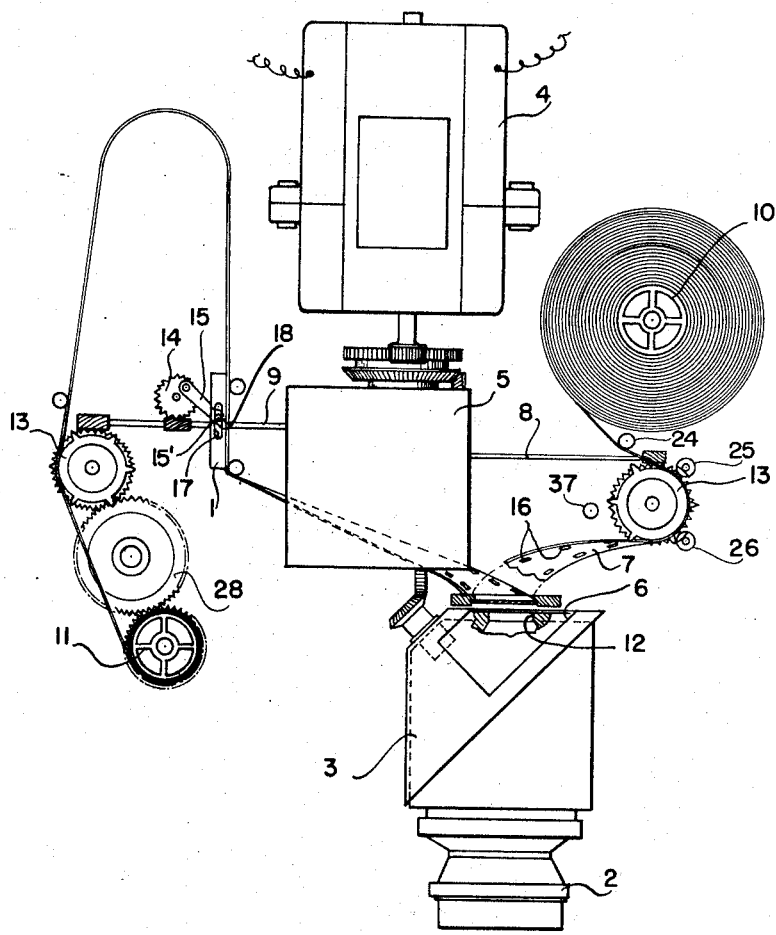
Figure 1 shows schematically an intermittent operation type motion camera of the type utilizing the teachings of this invention.

Referring to Figures 1 and 4, the camera includes a housing 1 supporting a lens 2, a shutter 3 and a motor 4 which drives the shutter through a suitable transmission 5. Shutter 3 as shown in Figure 1 is a frustrum shaped member having an opening or window 6 formed therein whereby rotation of the shutter will intermittently expose film strip 7 to light received through lens 2. The shutter and its actuating mechanism continuously rotates unidirectionally allowing the camera to operate under high acceleration loads without noticeably affecting the shutter speed.

Transmission 5 which drives shutter 3 is schematically shown in Figure 1 as being provided with output shafts 8 and 9 for feeding film strip 7 from storage spool 10 to take-up spool 11 via the camera exposure slot 12. Output shafts 8 and 9 from transmission 5 rotate at a substantially constant velocity to drive a film sprocket wheel 13 (two are shown in the Figure 1 schematic for more conveniently illustrating the operation of the camera) for moving the film at the storage and take-up spools 10 and 11 respectively at a substantially constant velocity. Output shaft 9 from transmission 5 also drives an eccentric wheel 14 for actuating a film advancing pawl 15. Pawl 15 engages successive notches 16 formed in the film strip to intermittently advance the film segment which is being exposed to light through lens means 2. The pawl is provided with a pin 15' which rides in a slot 17 formed in camera housing 1. As eccentric 14 is rotated the tip end 18 of pawl 15 is caused to move in a combination reciprocal and rotary fashion such that intermittent movement of the film is accomplished at the exposure slot.

The only intermittent movement in the camera involves a small segment of the film strip and the film advancing pawl 15. Both of these masses are small as related to torque input, thus accelerations have a relatively insignificant effect on them. This is particularly true of the film advancing pawl 15, the movement of which is well defined by slot 17 and eccentric 14.

In the actual camera configuration which is illustrated in Figures 2 through 6, film strip 7 is carried within a magazine 19 adapted to be inserted into a compartment 46 formed in camera housing 1. Film strip 7 is rolled on storage spool 10 and as it is unwound and exposed it is re-wound on take-up spool 11. Both the storage and take-up spools are rotatably carried on shafts 50 and 51 respectively secured to magazine 19. Film drive sprocket wheel 13, also carried within magazine 19, engages film strip 7 to guide the same off the storage spool and onto the take-up reel and to fix the length of film strip employed in the exposure path.

The film strip exposure path as shown in Figure 2 begins at storage spool 10 and extends around sprocket 13 to the front end 20 of the magazine where the film is guided past an opening 21. Thence it is directed by means of guide member 22 towards the aft end 23 of the magazine. It is then looped back adjacent the storage spool to again engage sprocket 13 before being wrapped around take-up spool 11. Pins 24, 25, and 26 are secured to magazine 19 for properly guiding the film strip onto the sprocket wheel.

A spur gear 27 secured to sprocket wheel 13 drives take-up spool 11 through an idler gear 28. Friction clutches (not shown) of conventional design are employed in the take-up and storage spools to maintain a slight tension load on the unexposed portion of the film strip between the storage spool and the sprocket and on the exposed portion of the film strip between the sprocket and the take-up spool.

As is apparent from the drawing, the total length of film in the exposure loop which is that portion of the film strip guided past exposure opening 21 and looped back to engage sprocket wheel 13 for the second time is fixed by the sprocket wheel. When loading the magazine it is important that a considerable amount of slack in this portion of the film strip be provided as shown in the drawing to allow the intermittent movement at the exposure opening and to prevent kinking of the film.

Film strip 7 is guided past opening 21 in magazine 19 by a pressure plate 29 which is spring urged toward the film strip and opening 21 by springs 49 on member 30 as most clearly shown in Figure 5. A spring latch 31 is carried on pressure plate 29 for engaging notches 16 in film strip 7 and preventing retrograde movement thereof.

A slot 32 is formed in the front end 20 of magazine 19 adjacent opening 21 for receiving film advancing pawl 15. To permit the hook 18 on pawl 15 to project through notches 16 in the film strip a sufficient distance to insure a positive engagement during the forward film advancing stroke, pressure plate 29 is provided with a recess 33 corresponding in plan form size to slot 32 in the magazine.

Referring to Figure 3 it is seen that sprocket wheel 13 carries a gear 34 externally of magazine 19 in well 35. When the magazine is inserted in compartment 46 of camera housing 1, gear 34 operatively connects with a retractable segmented driving gear 36 (in Figure 1 this is represented by output shaft 8 from transmission 5).

When the camera is in operation, sprocket wheel 13 is rotated at a substantially constant velocity by the drive member 36. Also during camera operation, film advancing pawl 15 advances film strip 7 at opening 21 in the magazine only while shutter 3 is closed so as not to blur the image. Thus, it is apparent that the segment of the film at the exposure opening 21 moves intermittently, introducing oscillations in the film strip. When subject to shock and vibration, these oscillations of the film strip may be amp'ified and cause the strip to be carried around by the sprocket on wheel 13 and bind between the sprocket wheel and storage spool 10, jamming the camera. To avoid this, a stripping pin 37 is carried by magazine 19 adjacent sprocket wheel 13 to limit the amount the film can wrap itself around the sprocket wheel.

Guide member 38 swingably carried by magazine 19 keeps the film from interfering with take-up spool 11 and cooperates with stripping pin 37 to maintain a defined path for the film strip.

To realize dependable camera operation it is obviously necessary not only to prevent the film strip from binding, but also to maintain the segmented drive member 36 and pawl 15 properly engaged with gear 34 and notches 16 in the film strip, respectively, at all times including during the application of the shock and vibration loads. Furthermore, it is necessary to hold the film a substantially fixed distance from the lens means. Thus, magazine 19 must be restrained against relative movement with respect to housing 1 of the camera. This is accomplished as il'ustrated in Figure 4 by securing a leaf spring 39 to the hinged cover 38 of compartment 46. One end 43 of the leaf spring is secured to cover 38. The free end 40 of leaf spring 39 is bent outwardly away from the wall of the cover and braced by a rod detent 41 inserted between spring 39 and the corner 42 of cover 38. Only one edge of the film magazine engages spring 39 at the sloping segment between detent 41 and the other end 43 which is secured to the cover. Thus, any movement of the magazine in an aft direction out of engagement with pawl 15 is restrained by not only the force exerted by spring 39, but also by a frictional force acting between the side wall 44 of compartment 46 and the contiguous wall of magazine 19. Due to the manner in which spring 39 is permitted to deflect by use of the rod detent, a force is produced pushing the magazine against the side of the compartment, which force increases with the aft movement of the magazine, producing a frictional drag force proportional in magnitude to the acceleration load which is urging the magazine to move. By this means a large frictional force may be produced to prevent relative movement between the magazine and the housing and at the same time permit manual closing of cover 38.

In loading the camera, the unexposed film is inserted into the magazine as illustrated in Figure 2 and the magazine is then inserted into compartment 46 of the camera so that the front end 20 thereof is seated against camera housing structure 45. Then, cover 38 is moved to the closed position shown in Figure 4 and locked wherein spring 39 urges the magazine both forwardly and against compartment side wall 44 so that both pro"er engagement of pawl 15 with film strip 7 and a substantially fixed distance between the film strip at opening 21 in the magazine and the lens system may be maintained under all operating conditions.

In operation camera motor 4 is energized to rotate shutter 3 and advance the film strip 7 past the exposure aperture intermittently as hereinabove described. Oscillations of the film strip due to continuous rotation of the storage and take-up spools and intermittent movement of the film at the exposure slot is limited and controlled by use of stripping pin 37 to positively effect re'ase of the film by sprocket wheel 13 and prevent the film from becoming tangled. The leaf spring 39 and detent 41 arrangement effectively produces restraining forces on the magazine which increase with the application of loads tending to cause displacement of the magazine relative to the housing, allowing the camera drive mechanism to operate effectively in advancing the film strip.

It should be understood that while a specific camera configuration has been shown, it is merely for il'ustrative purposes and that certain alterations, modifications, and substitutions made by the instant disclosure without departing from the spirit and scope of the invention as defined by the appended claims.

We claim:

1. A motion camera for use in a high acceleration environment comprising, a housing forming a light tight enclosure, said housing having an opening formed therein, lens means carried by said housing and arranged concentric with said opening through which light is admitted into said enclosure, rotating shutter means carried by said housing and intermittently blocking the opening into said housing in response to rotation of the shutter means, film storage and take-up spools carried within said housing, a film strip carried on said storage and take-up spools, guide means engaging said film strip and causing the latter to follow a path between the storage and the take-up spools intercepting light from said lens means, said film strip having a series of notches formed therein substantially throughout its length, a sprocket wheel adapted to engage said notches and move said film strip from the storage spool to the take-up spool at a substantially constant velocity, and maintain a film exposure loop of substantially constant length, drive means carried by said housing and operatively engaging said sprocket and shutter means, a film engaging pawl carried by the housing and operatively connecting with said drive means and arranged to engage successive notches on the film and advance the segment of the film at said guide means only intermittently whereby the segment is motionless during the interval in which it is being exposed by light from said lens means, a guide member swingably carried by said housing on one side of the film strip adjacent said sprocket wheel and extending beyond said take up spool to limit lateral movement of the film strip in one direction, and a generally cylindrical film stripping pin fixedly secured at only one end to the housing adjacent said sprocket wheel on the other side of said film strip and limiting the wrap around of said film strip on said sprocket wheel whereby jamming due to the affect of acceleration loads on the oscillations of the film strip caused by continuous rotation of the storage and take-up spools and the intermittent movement of the film segment at the guide means is avoided, said film stripping pin extending into the enclosure formed by said housing a distance substantially equal to the width of the film strip.

2. A motion camera adapted for use in a high acceleration environment comprising, a housing, said housing forming a compartment, lens means carried by said housing for admitting light into said compartment, a film magazine slidably received within said compartment, film storage and take-up spools carried by said magazine, a film strip connecting at one end to said storage spool and at its opposite end to said take-up spool, said magazine having an opening formed therein and optically aligned with said lens means for exposing the film, drive means carried by said housing, a sprocket wheel carried by said magazine and operatively engaging said drive means and said film strip for moving the latter form one spool to the other at a substantially constant velocity, a film engaging pawl carried by said housing and driven by said drive means for engaging said film strip and moving the portion thereof adjacent to the opening in said magazine only intermittently whereby the film segment being exposed is always motionless, a film stripping pin carried by the housing adjacent said sprocket wheel and limiting the wrap around of said film strip on said sprocket wheel whereby jamming due to the affect of acceleration loads on the oscillations of the film strip caused by continuous rotation of the storage and take-up spools and the intermittent movement of the film segment being exposed is avoided, a door hinged to said housing for closing said compartment, a leaf spring secured at one end to said door and having the free end thereof curved to wrap around an aft corner of the magazine and urge the same towards said lens means, a detent carried by said door and supporting said leaf spring adjacent the free end thereof at said aft corner of the magazine whereby the spring acting on said magazine provides a force pushing the latter both towards said lens means and against the side of the compartment, which side force increases with the aft movement of the magazine, producing frictional drag restraining the magazine against movement relative to the pawl and lens means under acceleration loads.

3. A motion camera adapted for use in a high acceleration environment comprising, a housing, said housing forming a compartment, lens means carried by said housing for admitting light into said compartment, a film magazine slidably received within said compartment, said magazine having an opening formed therein and optically aligned with said lens means for exposing film, a door releasably secured to said housing for closing said compartment, a leaf spring secured at one end to said door and curved to wrap around an aft corner of the magazine and urge the same towards said lens means, and a detent carried by said door and supporting said leaf spring adjacent the free end thereof at said aft corner of the magazine whereby the spring acting on said magazine provides a force pushing the latter both forwardly and against the side of the compartment, which force increases with the aft movement of the magazine, producing frictional drag limiting relative movement between the magazine and said lens means.

References Cited in the file of this patent

UNITED STATES PATENTS

| | | |
|---|---|---|
| 1,742,796 | Underwood | Jan. 7, 1930 |
| 1,854,742 | Jenkins | Apr. 12, 1932 |
| 2,022,362 | Porter | Nov. 26, 1935 |
| 2,149,218 | Heinisch et al. | Feb. 28, 1939 |
| 2,226,175 | Merriman et al. | Dec. 24, 1940 |
| 2,342,512 | Gaty | Feb. 22, 1944 |
| 2,351,088 | Wilson et al. | June 13, 1944 |
| 2,423,562 | Lee | July 8, 1947 |
| 2,462,687 | Stava | Feb. 22, 1949 |
| 2,504,317 | Frankel | Apr. 18, 1950 |
| 2,505,661 | Briskin et al. | Apr. 25, 1950 |
| 2,530,448 | Boecking | Nov. 21, 1950 |
| 2,675,736 | Gentilini et al. | Apr. 20, 1954 |
| 2,771,816 | Pfaff | Nov. 27, 1956 |